United States Patent [19]

Guo

[11] Patent Number: 5,521,249
[45] Date of Patent: May 28, 1996

[54] POLYURETHANES FROM COPOLYMERS OF ALLYL ALCOHOL PROPOXYLATES AND VINYL AROMATIC MONOMERS

[75] Inventor: Shao-Hua Guo, West Chester, Pa.

[73] Assignee: ARCO Chemical Technology, L.P., Greenville, Del.

[21] Appl. No.: 420,517

[22] Filed: Apr. 12, 1995

Related U.S. Application Data

[62] Division of Ser. No. 249,106, May 26, 1994, Pat. No. 5,451,631, which is a division of Ser. No. 98,114, Jul. 28, 1993, Pat. No. 5,382,642.

[51] Int. Cl.[6] .................................................. C08F 8/30
[52] U.S. Cl. ........................... 525/123; 524/507; 521/50; 521/137; 521/159; 525/127; 525/128; 525/130; 525/131; 528/44; 528/76; 528/392
[58] Field of Search ...................................... 525/123, 130, 525/127, 128, 131; 521/50, 137, 159; 524/507; 528/44, 76, 392

[56] References Cited

U.S. PATENT DOCUMENTS

| | | | |
|---|---|---|---|
| 2,894,938 | 7/1959 | Chapin | 260/88.1 |
| 2,940,946 | 6/1960 | Shokal et al. | 260/23 |
| 3,268,561 | 8/1966 | Peppel et al. | 260/348 |
| 3,823,201 | 7/1974 | Pizzini et al. | 260/861 |
| 4,122,056 | 10/1978 | Ramlow et al. | 260/29.6 |
| 4,264,755 | 4/1981 | Cross | 526/332 |
| 4,327,005 | 4/1982 | Ramlow et al. | 524/377 |
| 4,618,703 | 10/1986 | Thanawalla et al. | 560/209 |
| 4,722,978 | 2/1989 | Yu | 525/403 |
| 5,109,075 | 4/1992 | Yu | 525/404 |
| 5,162,475 | 11/1992 | Tang et al. | 526/333 |

FOREIGN PATENT DOCUMENTS

| | | | |
|---|---|---|---|
| 45-28786 | 9/1970 | Japan | 526/333 |

OTHER PUBLICATIONS

Influence of Allyl Ethers on Free Radical Polymerization of Styrene, Department of Polymer Technology, Hull, et al. *J. Polymer Science, Part A, Polymer Chemistry Ed*, 29 (1991) 9.

Chemistry of Epoxy Compounds, Swern, et al. *J. Am. Chem. Soc.* 71 (1945) 1152.

*Primary Examiner*—Judy M. Reddick
*Attorney, Agent, or Firm*—Jonathan L. Schuchardt

[57] ABSTRACT

Copolymers of vinyl aromatic monomers and propoxylated allyl alcohols having an average of 2 or less oxypropylene groups are disclosed. The copolymers, which have hydroxyl numbers of 80–260 mg KOH/g and number average molecular weights from 500–3500, are particularly useful for polyurethanes, alkyd resins and coatings, melamine-based coatings, and unsaturated polyester resins.

6 Claims, No Drawings

POLYURETHANES FROM COPOLYMERS OF ALLYL ALCOHOL PROPOXYLATES AND VINYL AROMATIC MONOMERS

This is a division of application Ser. No. 08/249,106, filed May 26, 1994, now allowed and now U.S. Pat. No. 5,451,631, which is a division of application Ser. No. 08/098,114, filed Jul. 28, 1993, now U.S. Pat. No. 5,382,642.

FIELD OF THE INVENTION

The invention relates to copolymers made from vinyl aromatic monomers and low molecular weight propoxylates of allyl alcohol. The copolymers, which have hydroxyl and olefin functionalities, are resinous polyols that are particularly useful for polyurethanes, alkyd resins and coatings, melamine coatings, and unsaturated polyesters.

BACKGROUND OF THE INVENTION

Allyl alcohol, which is made commercially by isomerizing propylene oxide, is widely used to make allyl ether and allyl ester derivatives for pharmaceuticals, fragrances, and chemical intermediates. Allyl alcohol advantageously features both hydroxyl and olefin functional groups; however, because it is flammable and highly toxic, allyl alcohol must be handled carefully. For many applications, propoxylated allyl alcohols, i.e., reaction products of allyl alcohol and an equivalent or two of propylene oxide, are favorable replacements for allyl alcohol because they have the same functional groups (and similar reactivity), but are less volatile and less toxic.

Allyl alcohol copolymerizes with vinyl aromatic monomers such as styrene (See, for example, U.S. Pat. Nos. 2,894,938 and 2,940,946). Because of the large reactivity difference between the monomers, the process is run with a large excess of allyl alcohol; unreacted allyl alcohol is recovered by distillation and is then recycled to the polymerization reactor. The resulting styrene/allyl alcohol copolymers are used in a variety of products, including polyesters, fatty ester emulsions, and uralkyds. The insolubility of styrene/allyl alcohol copolymers in polyether polyols limits their usefulness in polyurethane foams.

Hult and Johansson (*J. Polym. Sci., Part. A, Polym. Chem. Ed.* 29 (1991) 9) polymerized styrene in the presence of up to 12 mole percent of ethylene glycol monoallyl ether or propylene glycol monoallyl ether, and concluded that allyl ethers do not copolymerize with styrene, but inhibit styrene polymerization.

Copolymers of vinyl aromatic monomers and higher molecular weight polyether polyols containing unsaturation are known. For example, U.S. Pat. No. 3,823,201 (Pizzini et al.) teaches graft copolymer dispersions made by reacting vinyl monomers with polyether polyols having functionalities of 2 to 6, preferred equivalent weights of 250 to 5000, and unsaturations of 0.10 to 0.70 meq/g. U.S. Pat. No. 4,264,755 (Cross) teaches hydroxy-functional vinyl copolymers produced by copolymerizing styrene with a mono- or diallyl ether of a saturated aliphatic polyol having a hydroxyl functionality of 3–4. The resulting copolymers have hydroxyl numbers from 45 to 100, and number average molecular weights from 7,000 to 20,000.

U.S. Pat. No. 4,722,978 (Yu) teaches allyl-terminated polyether macromonomers ("macromers"). Cationic polymerization of an epoxide or glycidyl ether in the presence of an allylic alcohol starter gives a macromer that has from 2 to 500 oxyalkylene units. The macromer copolymerizes with vinyl monomers, including styrene. New copolymers derived from allyl monomers and vinyl aromatic monomers are needed. Preferably, the copolymers would be soluble in polyether polyols, and could be made from monomers that are volatile enough to recover from a polymerization mixture by distillation. Copolymers useful in a variety of alkyd resin, polyurethane, and melamine-based products, especially coatings, would be desirable.

SUMMARY OF THE INVENTION

The invention is a copolymer of a vinyl aromatic monomer and a propoxylated allyl alcohol. The propoxylated allyl alcohol has the formula $CH_2=CH-CH_2-(A)_n-OH$, in which A is an oxypropylene group, and n, which is the average number of oxypropylene groups, has a value less than or equal to 2. The vinyl aromatic/propoxylated allyl alcohol copolymer has a hydroxyl number within the range of about 80 mg KOH/g to about 260 mg KOH/g, and a number average molecular weight within the range of about 500 to about 3500.

The invention includes polyurethanes, alkyd resins and coatings, melamine-based coatings, and unsaturated polyester resins made from the vinyl aromatic/propoxylated allyl alcohol copolymers. The improved solubility of the copolymers of the invention in polyethers expands their usefulness in polyurethanes relative to styrene/allyl alcohol copolymers.

Because the propoxylated allyl alcohols used in the invention have an average of 2 or less oxypropylene units, they are volatile enough to use in excess in copolymerizations with vinyl aromatic monomers; unreacted propoxylated allyl alcohols are efficiently recovered by distillation and reused. This feature permits the synthesis of copolymers that include up to about 50 mole percent of propoxylated allyl alcohol recurring units.

DETAILED DESCRIPTION OF THE INVENTION

The copolymers of the invention have recurring units of a vinyl aromatic monomer and a propoxylated allyl alcohol. Vinyl aromatic monomers useful in the invention are aromatic compounds that have a $-CH=CH_2$ group attached to an aromatic ring. Suitable vinyl aromatic monomers include, but are not limited to, styrene, alkyl-substituted styrenes (e.g., 4-methylstyrene, 4-tert-butylstyrene, 2,6-dimethylstyrene), halogenated styrenes (e.g., 4-chlorostyrene, dichlorostyrenes, dibromostyrenes, tribromostyrenes), vinyl naphthalenes, and the like, and mixtures thereof. A minor proportion of a di- or polyvinyl aromatic monomer such as divinylbenzene can be included if a greater degree of crosslinking is desired, although preferably only a monovinyl aromatic monomer is used. Styrene and halogenated styrenes are preferred vinyl aromatic monomers.

A propoxylated allyl alcohol is copolymerized with the vinyl aromatic monomer. Suitable propoxylated allyl alcohols have the formula:

$CH_2=CH-CH_2-(A)_n-OH$ in which A is an oxypropylene group, and n, which is the average number of oxypropylene groups in the propoxylated allyl alcohol, has a value less than or equal to 2. The oxypropylene groups in the propoxyated allyl alcohols have one or both of the structures $-OCH(CH_3)-CH_2-$ and $-OCH_2-$ CH(CH$_3$)—, which will depend on the method of synthesis. Suitable propoxylated allyl alcohols can be prepared by reacting allyl alcohol with up to 2 equivalents of propylene oxide in the presence of a basic catalyst as described for example, in U.S. Pat. Nos. 3,268,561 and 4,618,703, and *J. Am. Chem. Soc.* 71 (1949) 1152, the teachings of which are incorporated by reference herein in their entirety. Suitable propoxylated allyl alcohols can also be made by acid catalysis, as described, for example, in *J. Am. Chem. Soc.* 71 (1949) 1152. Preferred propoxylated allyl alcohols are those for which n has a value within the range of about 1.4 to about 1.8.

The vinyl aromatic/propoxylated allyl alcohol copolymers of the invention have hydroxyl numbers within the range of about 80 mg KOH/g to about 260 mg KOH/g, preferably within the range of about 100 mg KOH/g to about 200 mg KOH/g. The number average molecular weight of the copolymers will be within the range of about 500 to about 3500, preferably from about 1000 to about 2000. The copolymers of the invention will typically have average hydroxyl functionalities greater than 2, preferably from about 2 to about 6, and more preferably from about 3 to about 5.

The relative amounts of vinyl aromatic monomer and propoxylated allyl alcohol used to make the copolymers of the invention are not critical and can be adjusted as desired to control physical properties. Preferred copolymers will have at least about 10 mole percent of propoxylated allyl alcohol recurring units. Preferably, the mole ratio of vinyl aromatic monomer to propoxylated allyl alcohol recurring units is within the range of about 50:50 to about 90:10. A more preferred range is from about 60:40 to about 70:30.

The copolymers of the invention are made by copolymerizing a vinyl aromatic monomer and a propoxylated allyl alcohol in the presence of a free-radical initiator. Because the vinyl aromatic monomer reacts much faster than the propoxylated allyl alcohol, the polymerization is preferably performed with a large excess of the propoxylated allyl alcohol; this excess is needed to give copolymers having 10–50 mole percent of propoxylated allyl alcohol recurring units.

Unreacted propoxylated allyl alcohol is recovered by any suitable means, preferably distillation, and is returned to the polymerization reactor. Thus, it is important that the propoxylated allyl alcohol have no more than an average of two oxypropylene units so that unreacted material can be recovered from the polymer by distillation and be reused. When the average number of oxypropylene units exceeds 2, unreacted propoxylated alcohol is not easily distilled from the polymer product, and preparation of polymers having 10–50 mole percent of propoxylated allyl alcohol recurring units becomes impracticable.

In the process for preparing the vinyl aromatic/propoxylated allyl alcohol copolymers of the invention, the polymerization temperature, initiator half-life, and rate of vinyl aromatic monomer addition are preferably adjusted to minimize the concentration of unreacted vinyl aromatic monomer in the reactor at any given time during the polymerization. Thus, all of the propoxylated allyl alcohol is preferably present in the reactor at the start of the polymerization, while most of the vinyl aromatic monomer is added gradually during the polymerization. The vinyl aromatic monomer is added slowly enough to avoid accumulating a large concentration of vinyl aromatic monomer in the reactor. If a faster vinyl aromatic monomer addition rate is desired, the process can be performed at a higher temperature with a suitable initiator.

The free-radical initiator is chosen with the desired polymerization temperature and monomer addition rate in mind. Preferred free-radical initiators are peroxide and azo-type compounds that have a relatively short half-life at the polymerization temperature. Preferably, the initiator half-life is within the range of about 30 seconds and about 30 minutes at the polymerization temperature chosen. Those skilled in the art can select a suitable initiator by reviewing the literature available from suppliers of free-radical initiators, which typically gives the half-life at various temperatures for a given initiator. Generally, one selects an initiator that has a relatively short half-life at the desired reaction temperature.

The propoxylated allyl alcohol and the vinyl aromatic monomer are copolymerized at a temperature high enough to copolymerize the monomers, and high enough to prevent the vinyl aromatic monomer from accumulating in the reactor. Preferred polymerization temperatures are within the range of about 100° C. to about 250° C. A more preferred range is from about 135° C. to about 200° C.

The invention includes polyurethanes made with the vinyl aromatic/propoxylated allyl alcohol copolymers of the invention. The copolymers have hydroxyl functionalities and molecular weights in the same range as polyols that are typically used in polyurethanes. The copolymers can thus be used in combination with or in place of ordinary polyols in polyurethane coatings, sealants, elastomers, adhesives, and foams (flexible, rigid, semi-rigid).

For example, a useful polyurethane coating is made by reacting a styrene/propoxylated allyl alcohol copolymer with a polyisocyanate to make a prepolymer; the prepolymer is moisture cured or chain extended to give the coating. The styrene/propoxylated allyl alcohol copolymer is optionally used in part or whole as the chain extender. In another example, a flexible polyurethane foam is made. A copolymer of the invention is combined with a polyether polyol to give a homogeneous mixture. The mixture is combined in a one-shot process with toluene diisocyanate, amine catalyst, tin catalyst, surfactant, and water to produce a flexible polyurethane foam.

The invention also includes alkyd resins made with the vinyl aromatic/propoxylated allyl alcohol copolymers of the invention. The copolymer, or a mixture of the copolymer with glycerin or another low molecular weight polyol, is partially esterified with an unsaturated fatty acid to give an alkyd resin. The alkyd resin is combined with an organic solvent, and the resin solution is stored until needed. A drying agent such as lead acetate or cobalt acetate is added to the solution of alkyd resin, the solution is spread onto a surface, the solvent evaporates, and the resin cures leaving an alkyd coating of the invention. Suitable unsaturated fatty acids are those known in the art as useful for alkyd resins, and include, for example, oleic acid, ricinoleic acid, linoleic acid, linolenic acid, licanic acid, and the like, and mixtures thereof. Mixtures of unsaturated fatty acids and saturated fatty acids such as lauric acid or palmitic acid can also be used.

Instead of combining the alkyd resin with an organic solvent, the resin can be dispersed in water to make a water-based alkyd coating formulation. To improve the water dispersability of the alkyd resin, a free hydroxyl group in the alkyd resin can be converted to a salt. For example, the alkyd resin can be reacted with phthalic anhydride to give a resin that contains phthalic acid residues; addition of sodium hydroxide makes the sodium phthalate salt, and provides a water-dispersable alkyd resin derived from the vinyl aromatic/propoxylated allyl alcohol copolymer.

Alkyd resins derived from the copolymers of the invention can also be used for polyurethane coatings. For example, a styrene/propoxylated allyl alcohol copolymer is partially esterified with an unsaturated fatty acid to give an alkyd resin. The alkyd resin, which contains some free hydroxyl groups, is reacted with a polyisocyanate to give a prepolymer. The prepolymer then reacts with a chain extender or more of the alkyd resin to give an alkyd-modified polyurethane (uralkyd) coating.

The invention includes melamine-based coatings prepared from vinyl aromatic/propoxylated allyl alcohol copolymers. A copolymer of the invention reacts with a melamine-type crosslinking agent such as commercial grade hexamethoxymethyl-melamine to give a crosslinked coating. Suitable melamine-type crosslinking agents include, for example, CYMEL 303 crosslinking agent, a product of American Cyanamid Company.

The invention also includes unsaturated polyester resins prepared from vinyl aromatic/propoxylated allyl alcohol copolymers. The copolymers of the invention are used in place of some or all of the glycol component in a conventional unsaturated polyester synthesis. For example, styrene/propoxylated allyl alcohol copolymer is reacted with propylene glycol, maleic anhydride, and phthalic anhydride to produce an unsaturated polyester resin. The resin is combined with styrene, and is cured with a free-radical initiator to give a cured, thermoset polyester article.

The following examples merely illustrate the invention. Those skilled in the art will recognize many variations that are within the spirit of the invention and scope of the claims.

Preparation of Styrene/Propoxylated Allyl Alcohol Copolymers

EXAMPLE 1

Propoxylated allyl alcohol (average mol. wt. 150, average of 1.6 oxypropylene units per molecule, 1200 g) is charged to a 2-L reaction kettle equipped with an agitator, a condenser, an addition funnel, a temperature controller, and a nitrogen inlet. A solution of t-butylperbenzoate (60 g) in styrene (600 g) is charged to the addition funnel. The reaction kettle is purged with nitrogen, and the propoxylated allyl alcohol is heated to 135° C. The styrene/t-butylperbenzoate solution is gradually added over 6.5 h at 135° C. After the addition is complete, the reactor is cooled to 25° C. Unreacted monomer is removed by stripping under vacuum (1 mm Hg) while gradually heating the mixture to 250° C. The resulting styrene/propoxylated allyl alcohol copolymer (853 g) has hydroxyl number=107 mg KOH/g, and acidity= 0.002 mg KOH/g. Gel permeation chromatography (GPC) analysis of the copolymer using polypropylene glycol standards indicates: $M_w$=3700, $M_n$=1500.

EXAMPLE 2

The procedure of Example 1 is followed, except that VAZO 67 initiator (product of DuPont) [2,2'-azobis(2-methylbutyronitrile)] (60 g) is used instead of t-butyl-perbenzoate. The resulting styrene/propoxylated allyl alcohol copolymer (764 g) contains 25.7 mole percent of recurring units derived from propoxylated allyl alcohol (by carbon-13 NMR analysis). Hydroxyl number: 114 mg KOH/g. Acidity:<0.001 mg KOH/g. GPC data: $M_w$=2460; $M_n$=1250.

EXAMPLE 3

Preparation of Dibromostyrene/Propoxylated Allyl Alcohol Copolymer

Propoxylated allyl alcohol (as in Example 1) is charged to a 1-L reaction kettle equipped as in Example 1. A mixture of dibromostyrene (250 g) and VAZO 67 initiator (25 g) is charged to the addition funnel. After purging the reactor with nitrogen, the propoxylated allyl alcohol is heated to 135° C., and the dibromostyrene/initiator solution is added gradually over 6.0 h at 135° C. After the addition is complete, the reactor is cooled to 25° C. Unreacted monomer is removed by stripping under vacuum while gradually heating the mixture to 200° C. The resulting copolymer contains 47.4 mole percent of recurring units of propoxylated allyl alcohol. Hydroxyl number: 144 mg KOH/g. Acidity: 0.009 mg KOH/g. GPC results: $M_w$=2040; $M_n$=900.

The preceding examples are meant only to illustrate the invention. The scope of the invention is defined by the following claims.

I claim:

1. A polyurethane coating, adhesive, sealant, elastomer, or foam composition which comprises the reaction product of:
   (a) a di- or polyisocyanate;
   (b) optionally, one or more members selected from the group consisting of polyols, water, chain extenders, amine catalysts, tin catalysts, and, surfactants; and
   (c) a copolymer which comprises recurring units of:
      (i) a vinyl aromatic monomer; and
      (ii) a propoxylated allyl alcohol of the formula:

$$CH_2=CH-CH_2-(A)_n-OH$$

in which A is an oxypropylene group, and n, which is the average number of oxypropylene groups in the propoxylated allyl alcohol, has a value less than or equal to 2; and wherein the copolymer has a hydroxyl number within the range of about 80 mg KOH/g to about 260 mg KOH/g, and a number average molecular weight within the range of about 500 to about 3500, and wherein the mole ratio of vinyl aromatic monomer to propoxylated allyl alcohol recurring units in the copolymer is within the range of about 50:50 to about 75:25.

2. The polyurethane composition of claim 1 wherein the vinyl aromatic monomer is selected from the group consisting of styrene, alkyl-substituted styrenes, halogenated styrenes, and mixtures thereof.

3. The polyurethane composition of claim 2 wherein the vinyl aromatic monomer is styrene.

4. The polyurethane composition of claim 1 wherein n has a value within the range of about 1.4 to about 1.8.

5. A polyurethane coating, adhesive, sealant, elastomer, or foam composition which comprises the reaction product of:
   (a) a di- or polyisocyanate;
   (b) optionally, one or more members selected from the group consisting of polyols, water, chain extenders, amine catalysts, tin catalysts, and surfactants; and
   (c) a copolymer which comprises recurring units of:
      (i) styrene; and
      (ii) a propoxylated allyl alcohol of the formula:

$$CH_2=CH-CH_2-(A)_n-OH$$

in which A is an oxypropylene group, and n, which is the average number of oxypropylene groups in the propoxylated allyl alcohol, has a value less than or equal to 2; and wherein the copolymer has a hydroxyl number within the range of about 80 mg KOH/g to about 260 mg KOH/g, and a number average molecular weight within the range of about 500 to about 3500, and wherein the mole ratio of styrene to propoxylated allyl alcohol recurring units in the copolymer is within the range of about 50:50 to about 75:25.

6. The polyurethane composition of claim 5 wherein n has a value within the range of about 1.4 to about 1.8.

* * * * *